July 19, 1960

E. R. DAYTON 2,946,053

PICTORIAL DEVIATION INDICATOR

Filed Feb. 9, 1955

INVENTOR
EDWARD R. DAYTON
BY
ATTORNEY

Fig. 3

July 19, 1960  E. R. DAYTON  2,946,053
PICTORIAL DEVIATION INDICATOR
Filed Feb. 9, 1955  5 Sheets-Sheet 3

Fig. 4.

INVENTOR
EDWARD R. DAYTON
BY
ATTORNEY

E. R. DAYTON 2,946,053

PICTORIAL DEVIATION INDICATOR

Filed Feb. 9, 1955

INVENTOR
EDWARD R. DAYTON
BY
ATTORNEY

United States Patent Office 2,946,053
Patented July 19, 1960

2,946,053

PICTORIAL DEVIATION INDICATOR

Edward Risedorph Dayton, Huntington Station, N.Y., assignor to Sperry Rand Corporation, a corporation of Delaware Filed Feb. 9, 1955, Ser. No. 487,045

18 Claims. (Cl. 343—108)

This invention relates to aircraft navigation instrumentation, and more particularly is concerned with an instrument which gives a visual indication of the position and heading of an aircraft with respect to a selected line of bearing from a radio station and the distance of the aircraft from the radio station.

In cross-country instrument flying, pilots of aircraft follow VHF omnidirectional radio ranges, more commonly referred to as "omniranges." The progress of an aircraft along an omnirange is communicated to the pilot by a visual display instrument. Heretofore, such instruments furnished information of the position and heading of the aircraft with respect to a selected line of bearing from a particular omnirange radio station whose radio signal was being received. Heading of the aircraft was represented by a rotatable bar or pointer, while deviation from the selected line of bearing was represented by lateral displacement of the bar or pointer from a reference index. When the aircraft passed over the radio station whose radio signal was being received, a flutter or other indication of uncertainty was noted in these instruments, due to the confused radio signals propagated vertically from the station. When the aircraft reached the region of clear radio signals beyond the station, a To-From indicator was actuated and the bar or pointer rapidly rotated through 180° to indicate that although the aircraft was still flying with the same heading, the radio station was now behind the aircraft. Such instruments gave the pilot no warning that he was approaching the radio station. Furthermore, the rapid change of the instrument from To to From indication could easily be overlooked by the pilot, who could not constantly be observing a particular instrument, but who sought information from the instrument by rapidly scanning its face from time to time.

When the aircraft has completed its cross-country instrument flight it is landed at the terminal airport. For landing by instruments information is received from ground based instrument landing systems. An example of such a system is the glide path localizer. It is desirable to use the same instrument that is used for cross-country navigation for landing navigation. The same rotatable bar or pointer represents the deviation from the localizer beam of the instrument landing system. It is sometimes desirable that the pilot be able to distinguish in observing the face of the instrument whether the aircraft is flying omnirange or a localizer beam. The absence of such a distinguishing feature could be confusing to the pilot.

It is therefore a principal object of this invention to provide an improved navigational instrument for furnishing visual information so as to overcome these disadvantages.

Another object of this invention is to provide an improved aircraft instrument for facilitating navigation along a VHF omnidirectional radio range.

Another object of this invention is to provide an instrument for presenting omnirange navigational information and range information on one dial.

Another object of this invention is to provide an aircraft instrument for producing a visual display representing the distance of an aircraft from a radio station, the deviation in heading of the aircraft from a selected line of bearing from the radio station, and the relative magnitude and sense of displacement of the aircraft from the selected line of bearing.

Another object of this invention is to provide improved means for indicating whether an aircraft is approaching or leaving the location of a navigation radio station.

Another object of this invention is to provide an improved navigation instrument whose information may be interpreted without ambiguity.

Another object of this invention is to provide an improved visual display instrument whose information may be more rapidly interpreted.

Another object of this invention is to provide an improved visual display instrument representing the distance of an aircraft from a radio station.

Another object of this invention is to provide an improved navigation instrument which permits both omnirange and glide path localizer navigation.

Another object of this invention is to provide an improved visual display instrument that distinguishes between omnirange and glide path localizer navigation.

In accordance with the present invention, there is provided an X-shaped indicator whose point of intersection represents the location of the omnirange radio station whose radio signal is being received. The location of the point of intersection with respect to a reference index representing the aircraft depicts the relative positions of the aircraft and the radio station. As the aircraft approaches the radio station, the displacement of the point of intersection of the indicator from the reference index smoothly approaches zero. As the aircraft departs from the radio station, the displacement of the point of intersection of the indicator from the reference index smoothly increases from zero with the correct sense of direction to represent the proper course of the aircraft. Relative rotation between the X-shaped indicator and the reference index and the relative separation of the point of intersection and the index also supply information as to the deviation in heading of the aircraft from a selected line of bearing from the radio station and the relative magnitude and sense of displacement of the aircraft from the selected line of bearing. To distinguish glidepath localizer operation provision is made to change the form of the indicator to a pair of parallel bars.

Other objects and advantages of the present invention will become apparent from the specification taken in connection with the accompanying drawings, wherein:

Figs. 2a, b, c, and d are simplified illustrations of the front elevation view of the instrument during operation.

Figure 1:
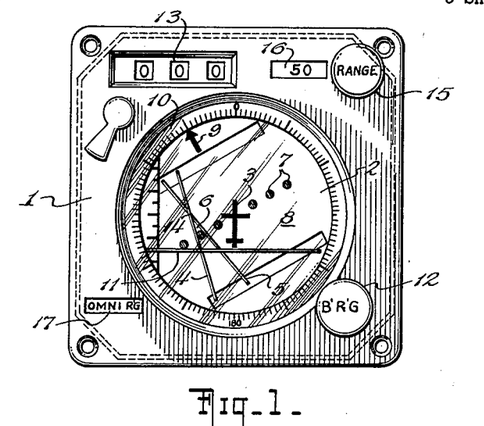
Fig. 1 is a front elevation view of the instrument as seen by the pilot.

Referring to Fig. 1 which discloses the face of the preferred embodiment of this invention, an instrument housing 1 mounts a viewing window 2. The viewing window 2 may be made of glass or some other transparent material. A first reference index 3 representing the aircraft is located substantially adjacent the center of the window 2. First reference index 3 is fixed in position and may be mounted on a suitable support or engraved or painted on the window 2. Also mounted adjacent the window 2 are a pair of substantially straight bars 4 and 5 intersecting at an acute angle designated by the reference numeral 6. The bars 4 and 5 are adapted to be translated relatively to reference index 3 and relatively to each other. The bars 4 and 5 are further adapted to be rotated about the center of reference index 3 as an axis, the center of index 3 being, for example, the point of intersection of the wing and fuselage of the representative aircraft. A second straight-line reference index 7, which may be inscribed on a circular card 8, is adapted to rotate about the first reference index 3 as an axis. This second reference index 7 may take the form of a straight line or a series of marks, such as dots, arranged in a straight line. The second reference index 7 is oriented perpendicularly to the bisector of the acute angle 6. The bars 4 and 5 and the card 8 are adapted to rotate in a cooperative manner such that the reference index 7 remains perpendicular to the bisector of the acute angle 6. A pointer 9 which may also be inscribed on card 8 lies on the diameter of the card that is perpendicular to the second reference index 7. A protractor 10 is affixed to the housing 1 so as to register with the pointer 9. A glide path pointer 11 mounted adjacent window 2 is adapted to be moved vertically with respect to the instrument housing 1 and with respect to reference index 3. A bearing selector knob 12 selects the desired line of bearing from the radio station along which the plane is to fly, the angle of said bearing appearing numerically in bearing window 13. The deviation of the aircraft heading from the selected line of bearing is represented by the angle between the bisector of the acute angle 6 and an imaginary vertical line which passes through the reference index. This angle of deviation is directly indicated by the pointer 9 in cooperation with protractor 10. The relative magnitude and sense of displacement of the aircraft from the selected line of bearing is indicated by the displacement of the point of intersection 14 of bars 4 and 5 from the first reference index 3 in a direction perpendicular to the bisector of angle 6, i.e., in a direction parallel to a line joining the dots representing the index 7. The distance between the point of intersection 14 of bars 4 and 5 and the second reference index 7, in a direction parallel to the bisector of acute angle 6, i.e., in a direction perpendicular to a line joining the dots representing the index 7, represents the distance of the radio station from the aircraft, and is determined by the relative displacement of bars 4 and 5 from each other. A range selector knob 15 controls the maximum distance represented by the intersecting bars, this maximum distance appearing numerically in range window 16. A mode-of-operation window 17 indicates whether the aircraft is flying along an omnirange radio beam or along a localizer radio beam.

Figure 2:
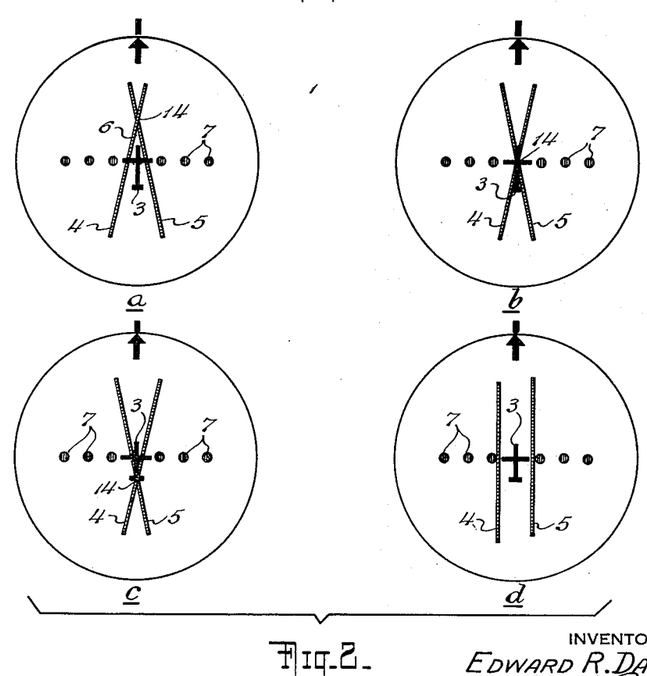

Figure 2 illustrates the appearance of the indicator for an aircraft flying along a selected course and approaching and passing over a radio station. When the aircraft is approaching the radio station, which is represented by the point of intersection 14, the point of intersection is displaced from the reference index 3, which represents the aircraft. As the aircraft approaches the radio station, the length of the bisector of acute angle 6 between index 3 and intersection 14 decreases, as shown in Fig. 2a. As the aircraft passes over the radio station the point of intersection 14 and the center of reference index 3 coincide, as shown in Fig. 2b. As the aircraft departs from the vicinity of the radio station, the length of bisector between the reference index 3 and the point of intersection 14 increases, as shown in Fig. 2c.

An alternative representation which may be used when the aircraft is approaching a localizer radio station is that of Fig. 2d. In this representation the bars 4 and 5 parallel each other. When an aircraft is flying along the selected line of bearing the center of the first reference index 3 lies midway between the parallel bars.

For an understanding of the significance of the elements of the face of this instrument, their operation and appearance will be described for the flight of an aircraft from one airport to another. The course of this flight and the appearance of the instrument face at various positions along the route are described with reference to Fig. 3. The aircraft is to fly from airport Able to airport Baker, and pass omnirange radio stations R and S. The aircraft is to take off from a runway of airport Able which has a magnetic bearing of 85°. To operate the instrument the bearing selector knob is turned to give a reading in the bearing window of 85°. The mode of operation is set for localizer by turning the frequency selector switch of the navigation receiver, which will be described later, to the proper frequency of the localizer radio station at airport Able. The plane is lined up on the runway. In this condition the face of the indicator will appear as portrayed in the indicator representation adjacent aircraft position A in Fig. 3. The aircraft then takes off and proceeds along the 85° line of bearing by keeping the first reference index centered between the parallel bars.

Figure 3:
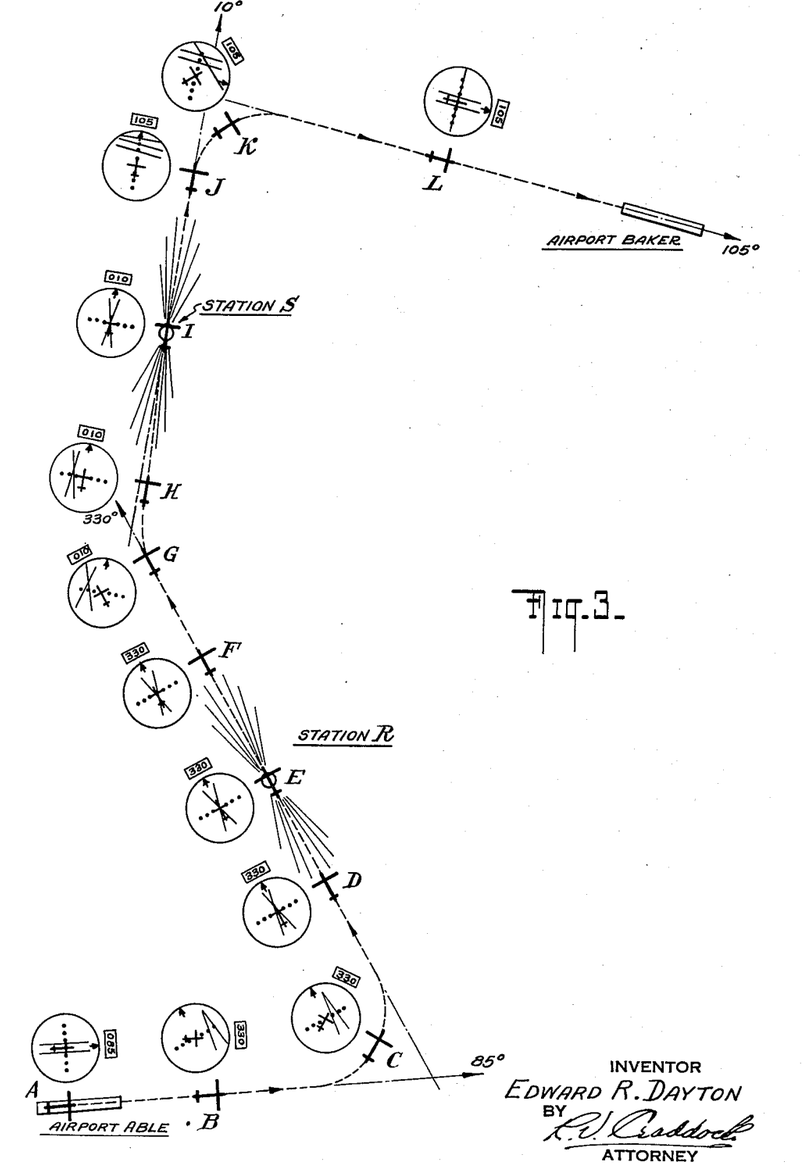
Fig. 3 is a flight path diagram used for illustrating the operation of the instrument of the present invention.

When the aircraft reaches point B, the pilot wishes to turn so as to head toward the omnirange station R. He wishes to approach station R along a 330° line of bearing. The pilot turns the frequency selector switch of the navigation receiver to the proper frequency of omnirange station R. This action automatically changes the mode of operation of the instrument such that the straight bars rotate relatively to each other so as to intersect at an acute angle. He also turns his bearing selector knob to a line of bearing of 330°. The card and associated intersecting bars will rotate relative to the first reference index and assume the position shown adjacent aircraft position B, in order to represent the angle of deviation between the selected line of bearing and the aircraft heading. The range selector knob may be adjusted for a maximum reading such as 50 miles. Since the aircraft is to the left of the selected line of bearing to omnirange radio station R, the instrument shows the aircraft, as represented by the first reference index, lying to the left of the selected line of bearing, as represented by the bisector of the acute angle of the intersecting bars. The aircraft then makes a turn as at C in order to approach station R along the selected line of bearing. This will cause the card and the straight bars to rotate relatively clockwise with respect to the first reference index. Furthermore, as the aircraft approaches the line of bearing, the point of intersection of the bars will move toward the first reference index in a direction perpendicular to the bisector of the acute angle formed by the bars.

At point D, the aircraft is flying along the selected line of bearing of 330° and is nearing station R. As shown on the indicator, the reference index 3 lies on the bisector of the acute angle formed by the intersecting bars. The length of bisector between the point of intersection and the first reference index is decreasing as the aircraft approaches station R. At point E the aircraft is flying over station R and the first reference index is coincident with the point of intersection of the bars. At point F, the aircraft is departing from station R and the distance between the first reference index and the point of intersection is increasing.

At point G, the pilot initiates the moves necessary to fly a new line of bearing so as to approach omnirange radio station S along a 10° line of bearing. He rotates the bearing selector knob for a 10° line of bearing and adjusts the frequency selector switch of his navigation receiver to the frequency of station S. The instrument now responds to radio signals of station S rather than station R. The insersecting bars will rotate clockwise relative to the first reference index and their point of intersection will be displaced to the left, since the aircraft is to the right of the selected line of bearing. Whereas, the aircraft was formerly departing from the station R, it is now approaching station S. Therefore, the point of intersection of the bars will shift in a direction parallel to the bisector of the acute angle formed by said bars to the position shown adjacent aircraft position G. At point H, the aircraft has completed its turn toward the new line of bearing. Although it is flying along a 10° magnetic bearing, the aircraft's course is displaced to the right of the 10 degree line of bearing to station S. This is indicated on the instrument by the fact that the point of intersection of the bars are to the left of the first reference index.

At point I, the aircraft is immediately over station S. At point J, the pilot prepares to maneuver so as to land at airport Baker. He turns the frequency selector switch of the navigation receiver to the frequency of airport Baker localizer station. This automatically causes the intersecting bars to rotate relative to each other so as to assume a parallel indication which shows the pilot that he is flying toward a localizer radio station. The glide path pointer which was formerly stowed out of sight becomes actuated during localizer operation and makes its appearance on the instrument face. The pilot then rotates the bearing selector knob to 105°, which is the desired line of bearing toward the airport in order to land on the runway. The display is shown adjacent aircraft position J. At point K, the aircraft is turning so as to approach the selected line of bearing. The aircraft is to the right of the selected line of bearing, which the instrument so indicates. Since the aircraft is below the glide path, the glide path pointer is near the top of the instrument. At point L, the aircraft is preparing to make a landing. Since it is flying along the selected line of bearing of 105°, the first reference index is centered between the parallel bars. The aircraft is flying along the glide path, which is indicated on the instrument by the coincidence between the glide path pointer and the first reference index.

An assemblage of electrical and electromechanical circuits which will actuate this instrument in accordance with the proper received radio signals is shown in Figs. 4, 5, 6 and 7.

Figure 4:
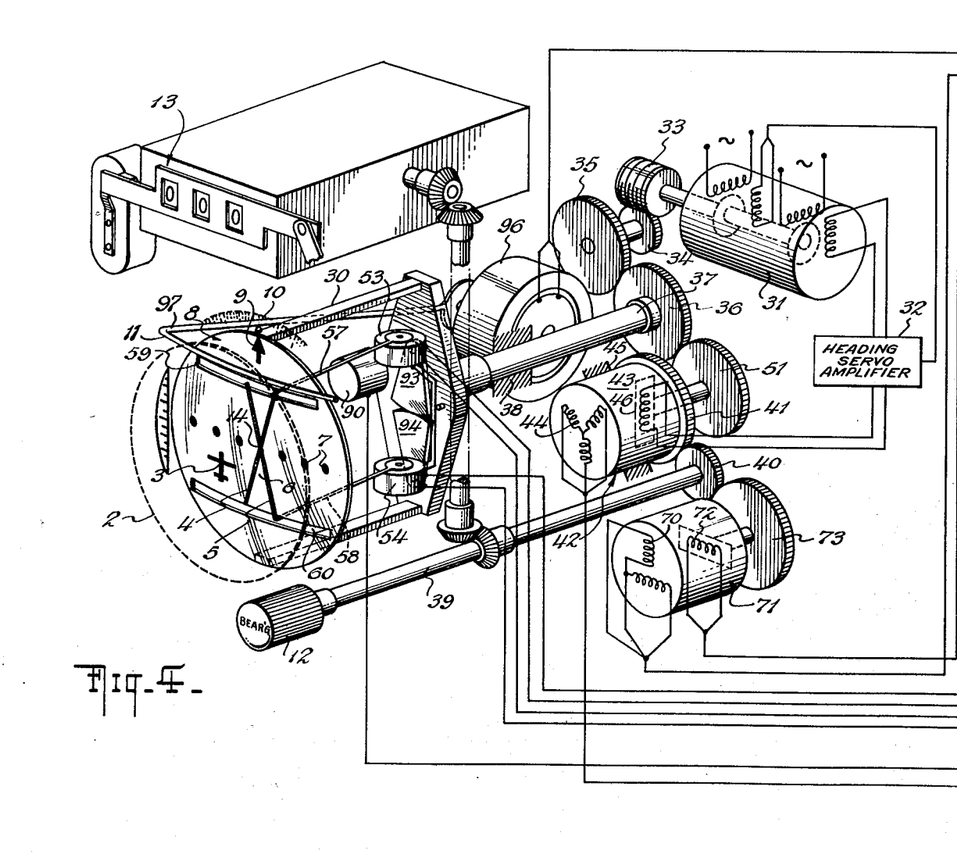
Figs. 4 and 5 together serve schematically to illustrate a preferred embodiment of the indicator of the present invention and of the apparatus associated therewith for controlling the indicating elements.

Deviation of the aircraft heading from the selected line of bearing is represented, as illustrated in Fig. 4, by the angle between the bisector of the acute angle 6, which is formed by the intersection of bars 4 and 5, and an imaginary vertical line which passes through reference index 3 and is indicated by the numeral "0" on the protractor 10. This deviation may be read directly in angular form by the position of pointer 9 in relation to protractor 10. The bars 4 and 5, their supporting and driving mechanism (to be described later), and card 8 on which is inscribed the second reference index 7 and pointer 9 are adapted to be rotated as a unit relative to reference index 3 in order to indicate this angle of deviation. The supporting and driving mechanism of bars 4 and 5 and the card 8 are affixed to and supported by yoke 30, which is rotated about its longitudinal axis by drive motor 31 in response to an error signal from heading servo amplifier 32. Drive motor 31 causes rotation of yoke 30 through a gear train comprising gears 33, 34, 35 and 36. Gear 36 is affixed to shaft 37 of yoke 30, the shaft being supported for rotation in bearing 38.

Figure 5:
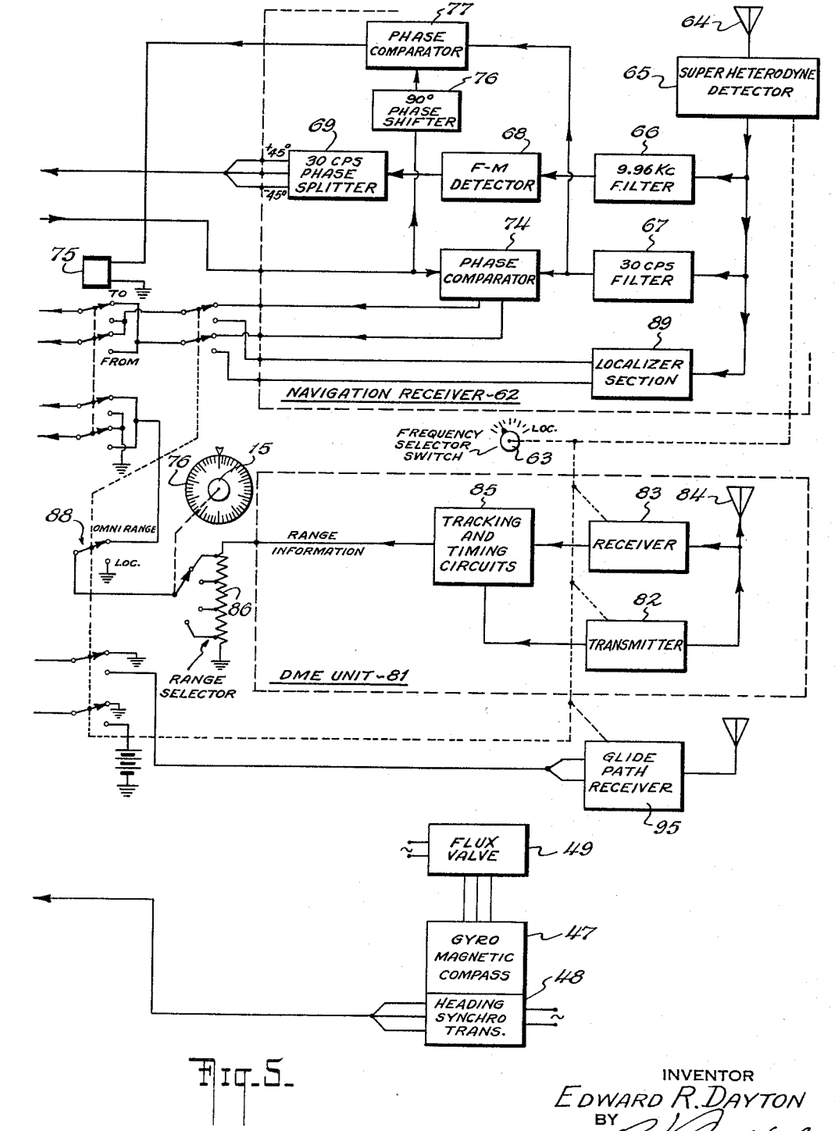

Information on the selected line of bearing is inserted into this instrument by manual rotation of bearing selector knob 12. The line of bearing selected is indicated in the bearing window 13, the numerals of which are actuated by a mechanical linkage shown partially in phantom and terminating in shaft 39, which is driven by knob 12. Bearing window 13 and its associated numerals may be an apparatus of the type described in U.S. Patent No. 2,732,550 by E. F. Reedy. Rotation of knob 12 causes rotation of gear 40 which is affixed to shaft 39. This rotational motion is transmitted by gear 40 to gear 41, which is affixed to the case 42 of synchro 43. The stator winding 44 of synchro 43 is affixed to its case 42, which is mounted for rotation in bearings 45. Synchro 43 comprises a conventional control transformer having rotatable stator winding 44 and rotor winding 46, so that in effect this synchro functions as a differential synchro. The yoke 30 and the bars 4, 5 and card 8 associated therewith are stabilized about the axis of rotation of said yoke in correspondence with a direction parallel to the selected line of bearing regardless of changes of heading of the aircraft. This is accomplished by means of the positional servo loop driving yoke 30 and comprising in series connection the synchro 43, the heading servo amplifier 32, and the drive motor 31, said synchro 43 being fed with an input signal from the slaved gyromagnetic compass 47 (Fig. 5) and heading synchro transformer 48 and a feedback signal from the gears 36, 51. The servo loop operates to position yoke 30 relative to reference index 3 in accordance with the angular difference between the bearing of the selected course and the heading of the aircraft relative to magnetic north. The slaved gyromagnetic compass 47 provides a signal at the output of heading synchro transformer 48 corresponding to the heading of the aircraft relative to magnetic north as established by a suitable magnetic reference, such as flux valve 49 as shown in Fig. 5. The output signal of heading synchro transmitter 48 is applied directly to the stator windings 44 of synchro 43. If the voltage induced in the rotor winding 46 of synchro 43 is not zero, such voltage will be amplified in heading servo amplifier 32, to which the rotor winding is connected, and applied to drive motor 31, which through gear train 33, 34, 35 and 36 rotates yoke 30. This rotational motion applied to yoke 30 is also transmitted to the rotor winding 46 of synchro 43 through gear 36 cooperating with gear 51, which is affixed to said rotor winding. Motor 31 drives yoke 30 in such a direction as to reduce the voltage induced on rotor winding 46 to zero. When this voltage has been reduced to zero, the yoke 30 has become stabilized with the selected line of bearing. Thus, the yoke 30, the bars 4, 5, and the card 8 will assume a rotational position in accordance with the difference between the heading of the aircraft relative to magnetic north and the selected line of bearing.

The relative magnitude and sense of displacement of the aircraft from the selected line of bearing is represented by the displacement of the bars 4, 5, and consequently of their point of intersection 14, from the first reference index 3 in a direction parallel to the second reference index 7. As shown in Fig. 4, the bars 4, 5 are adapted to be translated as a unit parallel to reference index 7 by means of meter movements 53 and 54, which may be of the D'Arsonval type, having a fixed permanent magnet and a movable current carrying coil. Bars 4 and 5 are mounted on bobbins of respective meter movements 53 and 54 by the respective arms 57 and 58. A common current which passes through coils 55 and 56 (Fig. 6) which are wound on said bobbins, causes movement of bars 4 and 5 in the same direction with respect to refeernce index 3. Arms 57 and 58 pass through respective slots 59 and 60 which are cut in card 8 parallel to the second reference index 7. The current for actuating coils 55 and 56 is derived as an output signal from the phase comparator 74 of the navigation receiver 62 (Fig. 5).

Navigation receiver 62 is a typical navigation receiver of the type which is used in omnirange systems. It produces an output signal that is representative of the bearing of the receiver from the particular omnirange radio station whose radio signal is being received. An example of such a receiver is found in the publication "The CAA VHF Omnirange" by H. C. Hurley et al., Technical Development Report No. 113, Civil Aeronautics Administration. In its operation, the receiver 62 is tuned to the frequency of the desired omnirange station by manual frequency selector switch 63, which is operated by the pilot. The signal from the station is picked up by antenna 64 and is detected by superheterodyne detector 65. The output of this detector is a pair of superimposed signals consisting of a 9.96 kc. signal frequency-modulated at 30 c.p.s. and a separate 30 c.p.s. signal. The two signals are separated by 9.96 kc. filter 66, and 30 c.p.s. filter 67. The signal from 9.96 kc. filter 66 passes to F.-M. detector 68 whose output is a 30 c.p.s. reference signal. The phase angle difference between the 30 c.p.s. signal of filter 67 and the reference 30 c.p.s. signal of detector 68 is a measure of the bearing of the aircraft with respect to the radio station, the phase angle difference varying in accordance with the bearing of the aircraft from said radio station. The output of filter 67 enters phase comparator 74.

The reference 30 c.p.s. output signal from detector 68 is applied to phase splitter 69 whose output constitutes two 30 c.p.s. signals which are displaced in phase +45° and −45° with respect to the input reference signal. These two output signals from phase splitter 69 are connected directly to the stator windings 70 of resolver 71 of Fig. 4. The angular position of the resolver rotor winding 72 with respect to the stator windings 70 is determined solely by the position of the bearing selector knob 12. Selection of a line of bearing by rotation of bearing selector knob 12 results in a corresponding rotation of rotor winding 72 through the gear train 40, 73. The resolver rotor output signal whose phase angle with respect to the original 30 c.p.s. reference signal is determined solely by the position of the bearing selector knob 12, is connected directly to phase comparator 74 (Fig. 5) in navigation receiver 62. If the aircraft is located on a line of bearing with respect to the radio station that is the same as the line bearing selected by knob 12 the output signal from the resolver will be in phase with the output signal of filter 67 and there will be no output from phase comparator 74. On the other hand, if the aircraft is located on a different line of bearing from the radio station than that selected by bearing knob 12, the phase angle between the two 30 c.p.s. signals entering phase comparator 74 will not be zero, and an output will be derived whose polarity depends on whether the phase of one signal leads or lags that of the other. The output of the phase comparator 74 is connected through the contacts of a To-From relay 75 to coils 55, 56 (Fig. 6) of meter movements 53, 54 (Fig. 4), which in turn actuate bars 4 and 5 in accordance with the magnitude and displacement of the aircraft from the selected line of bearing.

Referring again to Fig. 3, it is noted that when an aircraft flying a particular course passes over an omnirange radio station, its line of bearing with respect to that station is changed by 180°. Consequently, the phase of the 30 c.p.s. signal from filter 67 will shift by 180° with respect to the reference 30 c.p.s. from F.-M. detector 68. In order to maintain the proper sense of the displacement of bars 4 and 5 with respect to reference index 3 while approaching and leaving the station, it becomes necessary to reverse the current flowing through coils 55, 56 when the aircraft passes over the station. To obtain the reversal in current a To-From indication is needed, which must occur when the aircraft passes over the station.

To-From indication is obtained by comparing in phase comparator 77 (Fig. 5) the 30 c.p.s. output of filter 67 with the 30 c.p.s. output of resolver 71 as shifted by 90° in phase shifter 76. The output of phase comparator 77 will reverse in polarity as the aircraft passes over the radio station, due to the shift in phase of the output of filter 67. The output of phase comparator 77 is utilized to actuate To-From relay 75. Thus, one function of To-From relay 75 is to preserve the proper sense of displacement of bars 4, 5 with respect to index 3 as the aircraft passes over the radio station. A second function will be described later.

The distance of the aircraft from the omnirange station whose signal is being received is represented by the perpendicular distance between the point of intersection 14 of bars 4, 5 and the second reference index 7. If a second reference index is not provided on card 8 the distance of the aircraft from the radio station is represented by the displacement of the point of intersection 14 from reference index 3 in a direction parallel to the bisector of the acute angle 6 formed by bars 4 and 5. The point of intersection 14 is caused to be moved in a direction perpendicular to index 7 by displacing each of the bars 4, 5 relatively to the other in a direction parallel to index 7. A common current which passes through coils 79 and 80 (Fig. 6), which are wound on the same bobbins as coils 55 and 56, induces movement of bars 4 and 5 in opposite directions with respect to each other and with respect to reference index 3. The current for actuating coils 79 and 80 is derived as an output signal from the distance measuring equipment, referred to as DME unit 81 (Fig. 5).

DME unit 81 is a typical DME interrogator unit used as a short range navigational aid for aircraft. It provides an output which is a direct and continuous indication of the distance from a selected ground beacon. In this instance the selected ground beacon is located at the same site as the omnirange radio station. An example of such equipment is found in the publication "A Multichannel Distance Measuring Equipment for Aircraft" by E. B. Mulholland, Proceedings of the Institution of Radio Engineers Australia, vol. 13, No. 2, February 1952.

In its operation the transmitter 82 and the receiver 83 of DME unit 81 are tuned to the frequency of the desired DME ground beacon by frequency selector switch 63, which simultaneously tunes the navigation receiver and the DME unit. The transmitter 82 emits pulses at regular intervals, which are received by the ground beacon receiver and if such pulses are of proper frequency corresponding signal pulses are transmitted from the ground beacon. DME unit receiver 83 receives the pulses transmitted from the ground beacon and detects them. Automatic tracking and timing circuits 85 continuously measure the time interval between transmission of pulses from unit 81 and the reception of pulses from the ground beacon. The measure of this time interval, which is proportional to the distance between the aircraft and the beacon, is obtained as a D.-C. voltage from timing circuits 85. The D.-C. voltage output from timing circuits 85, which is proportional to the range of the aircraft from the beacon, is applied to coils 79 and 80 through the range selector switch 86 and the contacts of To-From relay 75. Coils 79 and 80 are connected in series so that a common current through them will produce opposite movement of bars 4 and 5. The maximum range represented by the instrument may be varied in accordance with the position of range selector switch 86, which is actuated by range selector knob 15. As shown in the figure, the switch is in the position of maximum sensitivity, or least range for maximum displacement of the point of intersection 14, from reference index 3.

The D.-C. range information voltage from unit 81 represents the magnitude of the distance of the aircraft from the ground beacon and consequently will contain no information of whether the aircraft is approaching or departing from the ground beacon location. In order to distinguish between an aircraft approaching a beacon and departing from a beacon the signal representing range information must be passed through the contacts of To-From relay 75. This operation may be explained by referring again to Fig. 2. In Fig. 2a the aircraft is approaching the beacon location. The range signal displaces bar 4 to the left of reference index 3 and bar 5 to the right of index 3. Thus reference index 3 is indicated in said figure as lying below the point of intersection 14. As the aircraft approaches the beacon the magnitude of the range signal diminishes and the two bars move toward reference index 3, bar 4 moving toward the right and bar 5 toward the left. In Fig. 2b the range information voltage has been reduced to zero as the aircraft passes over the beacon and the two bars intersect in coincidence with the center of index 3. As the aircraft departs from the vicinity of the beacon the range information signal will begin to increase once more. However, the current through coils 79 and 80 has been reversed due to operation of To-From relay 75. Thus, as the range information voltage begins to increase bar 4 will continue to move toward the right and bar 5 toward the left, causing the point of intersection 14 to move below reference index 3 and the instrument to give an indication of an aircraft departing from the vicinity of the beacon. This is indicated in Fig. 2c. Hence, the perpendicular distance between point of intersection 14 and reference index 7 is representative of the distance of the aircraft from the beacon.

Although the range information derived from the DME interrogator disclosed in the quoted reference is proportional to the slant range between the aircraft and the ground beacon, this information may be readily converted to ground range, if desired, by the application of well known trigonometric correcting circuits.

In accordance with another feature of this invention this instrument is adapted to be operated in conjunction with localizer signals received from radio equipment associated with instrument landing systems. When the equipment is to operate from such localizer signal the pilot selects the proper frequency with frequency selector switch 63 (Fig. 5). This action automatically tunes navigation receiver 62 and DME unit 81 to the correct frequency and simultaneously actuates omnirange-localizer switch 88 to localizer operation. Operation of switch 88 to the localizer position switches coils 55 and 56 from the output terminals of phase comparator 74 to the output terminals of localizer section 89 of navigation receiver 62. Localizer section 89 supplies a proper output signal to center the point of intersection 14 with respect to index 3 when the aircraft is flying on the localizer beam. Deviation of the aircraft to one side of the localizer beam will be indicated by a corresponding displacement of the point of intersection 14 in a direction parallel to second reference index 7.

Figures 6, 7:
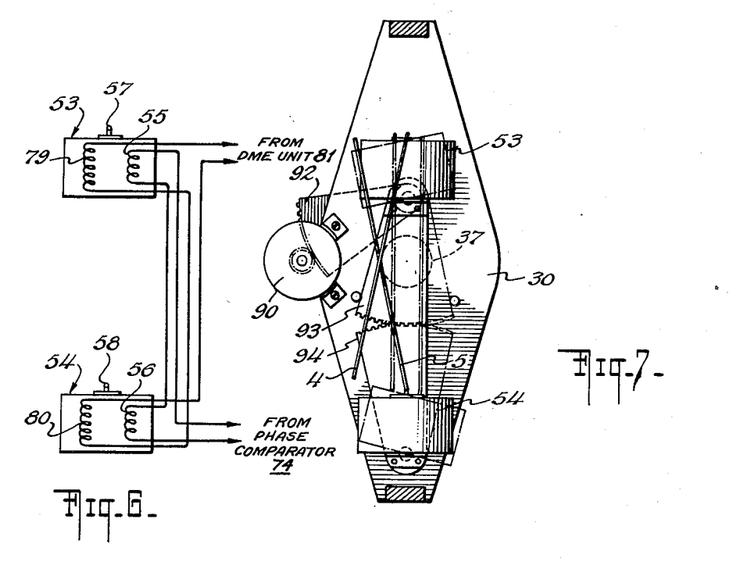
Fig. 6 is a schematic diagram of the meter movements of this instrument.
Fig. 7 is an elevation view (partially in section of yoke) forming part of the embodiment of the invention shown in perspective in Fig. 4.

To avoid confusion, the appearance of the indicator of this instrument may be altered for instrument landing system operation. The altered appearance is that shown in Fig. 2d, in which the bars 4, 5 are oriented parallel to each other rather than crossing at an acute angle. Use of this alternative form of display has the advantage of immediately informing the pilot when he looks at the instrument, that he is flying a localizer course rather than an omnirange course. Changing bars 4 and 5 from a crossed orientation to a parallel one may be accomplished by rotation of meter movements 53 and 54 as shown in Fig. 7. When the omnirange-localizer switch 88 (Fig. 5) is operated to the localizer position a voltage is applied to servomotor 90. Simultaneously switch 88 removes the range information signal of DME unit 81 from coils 79, 80. Rotation of servomotor 90 drives gears 92, 93 and 94, gears 92 and 93 being affixed to a common shaft. Meter movements 53 and 54 are mounted respectively on gears 93 and 94. Rotation of servomotor 90 results in opposite rotation of gears 93 and 94 and therefore meter movements 53 and 54 about the axes of the respective gears. As illustrated in Fig. 7 the solid lines indicate the position of meter movements 53 and 54 and bars 4 and 5 in the omnirange indication position and the dotted lines indicate the relative positions after rotation of the meter movements for localizer indication.

When the frequency selector switch 63 is operated to the localizer position the glide path receiver 95 (Fig. 5) is tuned and the omnirange-localizer switch 88 actuates the glide-path circuit. The output of the glide path receiver is connected to meter movement 96 through the contacts of switch 88. Meter movement 96 drives glide slope pointer 11 by means of arm 97. Glide path pointer 11 is normally stowed out of sight when the instrument is operating on omnirange. Operation of omnirange-localizer switch 88 to the localizer position actuates pointer 11 and puts it in an operative position, such as that of Fig. 1. Glide path receiver 95 receives a radio signal from the glide path of the instrument landing system and produces an output signal in accordance with the vertical deviation of the aircraft from this glide path. This signal applied to meter movement 96 (Fig. 4) serves to position pointer 11 with respect to reference index 3, so that when the aircraft is following the glide path, pointer 11 coincides substantially with the center of reference index 3.

Figure 8:
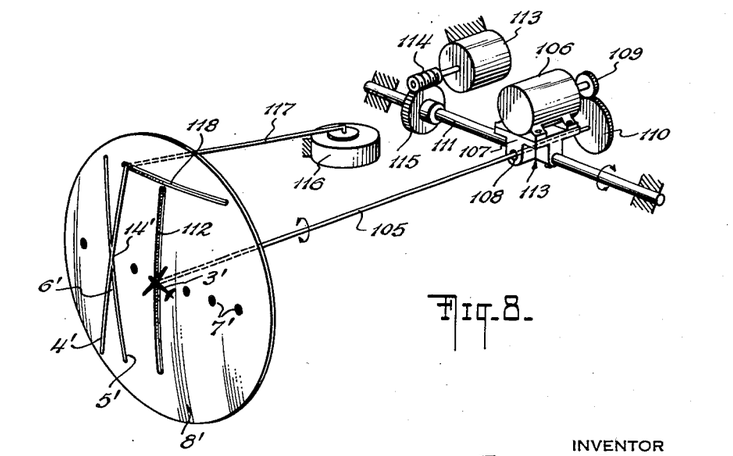
Fig. 8 is a simplified perspective view of another embodiment of this invention.

While the foregoing has described the preferred embodiment of this invention certain alternative forms of display which furnish the same information lie within the scope of this invention. An example of such an alternative embodiment is shown in Fig. 8. In this figure bars 4' and 5' are no longer relatively movable with respect to each other but instead are only adaptable for movement as a unit to the left or right of the center of the instrument. The bisector of the acute angle 6' formed by the intersection of bars 4' and 5' is always vertical with respect to the face of the instrument. Deviation in heading of the aircraft from the selected line of bearing to the radio station is represented by rotation of index 3' with respect to the non-rotatable bars 4' and 5'. The relative angle between index 3' and the bisector of angle 6' represents the angle of deviation. The relative magnitude and sense of displacement of the aircraft from the selected line of bearing to the radio station is represented by the distance between index 3' and the bisector of acute angle 6' in a direction parallel to reference index 7', which is inscribed on card 8'. The distance between the aircraft and the radio station is represented by the vertical distance from the index 3' to the reference index 7'. In this figure the intersecting bars 4' and 5' may be replaced, for example, by a unitary X-shaped structure.

Index 3' is adapted for rotation about the axis of shaft 105 in order to represent the deviation in heading of the aircraft from the selected line of bearing to the radio station. A signal in accordance with such deviation is fed to synchro 106, which is mounted on platform 107. Shaft 105 is supported for rotation about its own axis in bearing 108, which is held in a bore in platform 107. Rotating synchro 106 in accordance with the deviation signal results in rotation of shaft 105 and index 3' about the axis of shaft 105 by means of gear 109, which is driven by synchro 106 and gear 110, which is affixed to shaft 105. Index 3' is adapted to be translated perpendicularly to index 7' in order to represent the distance of the aircraft from the radio station. Such translation is accomplished by rotation of index 3' about the axis of shaft 111, wherein shaft 105 acts as a radial arm and moves along slot 112 of card 8'. Shaft 105 is adapted to rotate about the axis of shaft 111 by means of platform 107, which is affixed to shaft 111. A signal in accordance with such aircraft distance is fed to servo motor 113, which rotates shaft 111 by means of gear 114, driven by servo motor 113, and gear 115, which is affixed to shaft 111. Bars 4' and 5', which are here connected at their point of intersection 14', are adapted to be translated in a direction parallel to index 7' in order to represent the relative magnitude and sense of displacement of the aircraft from the selected line of bearing. A signal in accordance with such displacement is fed to meter movement 116, which actuates bars 4', 5' by supporting arm 117, moving in slot 118 in card 8'.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for producing a visual display representing the distance of an aircraft from a radio station, the deviation in heading of the aircraft from a selected line of bearing to the radio station, and the relative magnitude and sense of displacement of the aircraft from said selected line of bearing, comprising a reference index reprsenting the aircraft, an indicator comprising a pair of bars adapted to intersect and thereby define an angle, the bisector of said angle representing said selected line of bearing, means for producing relative rotation between said bisector and said reference index in accordance with the deviation in heading of the aircraft from said selected line of bearing, means for producing relative translatory motion between the point of intersection of said indicator and said reference index in a direction perpendicular to said bisector in accordance with the relative magnitude and sense of displacement of the aircraft from said selected line of bearing, and means for producing relative translatory motion between said point of intersection and said reference index in a direction parallel to said bisector in accordance with the distance of the aircraft from the radio station.

2. Apparatus as in claim 1 wherein said bars are rigidly connected together and movable as a unitary X-shaped structure.

3. Apparatus as in claim 1 wherein said bars are relatively translatable with respect to each other.

4. Apparatus as in claim 3 wherein said bars are further relatively rotatable with respect to each other.

5. Apparatus for producing a visual display representing the distance of an aircraft from a radio station, the deviation in heading of the aircraft from a selected line of bearing to the radio station, and the relative magnitude and sense of displacement of the aircraft from said selected line of bearing, comprising a reference index representing the aircraft, a substantially X-shaped indicator having acute vertical angles whose common bisector represents said selected line of bearing, means for producing relative rotation between said indicator and said reference index in accordance with the deviation in heading of the aircraft from said selected line of bearing, means for producing relative translatory motion between the point of intersection of said indicator and said reference index in a direction perpendicular to said bisector in accordance with the relative magnitude and sense of displacement of the aircraft from said selected line of bearing, and means for producing relative translatory motion between said point of intersection and said reference index in a direction parallel to said bisector in accordance with the distance of the aircraft from the radio station.

6. Apparatus for producing a visual display representing the distance of an aircraft from a radio station, the deviation in heading of the aircraft from a selected line of bearing to the radio station, and the relative magnitude and sense of displacement of the aircraft from said selected line of bearing, comprising a fixed reference index representing the aircraft, a substantially X-shaped movable indicator having acute vertical angles whose common bisector represents said selected line of bearing, means for rotating said indicator about said reference index as an axis in accordance with the deviation in heading of the aircraft from said selected line of bearing, means for translating the point of intersection of said indicator perpendicularly to said bisector in accordance with the relative magnitude and sense of displacement of the aircraft from said selected line of bearing, and means for translating said point of intersection parallel to said bisector in accordance with the distance of the aircraft from the radio station.

7. Apparatus for producing a visual display representing the distance of an aircraft from a radio station, the deviation in heading of the aircraft from a selected line of bearing to the radio station, and the relative magnitude and sense of displacement of the aircraft from said selected line of bearing, comprising a first reference index representing the aircraft, a substantially X-shaped indicator having acute vertical angles whose common bisector represents said selected line of bearing, means for producing relative rotation between said indicator and said first reference index in accordance with the deviation in heading of the aircraft from said selected line of bearing, a straight-line second reference index disposed perpendicularly to said bisector, and adapted to maintain a constant perpendicular relationship to said bisector, means for producing relative translatory motion between the point of intersection of said indicator and said first reference index in a direction parallel to said second reference index in accordance with the relative magnitude and sense of displacement of the aircraft from said selected line of bearing, and means for producing relative translatory motion between said point of intersection and said first reference index in a direction perpendicular to said second reference index in accordance with the distance of the aircraft from the radio station.

8. Apparatus for producing a visual display representing the distance of an aircraft from a radio station, the deviation in heading of the aircraft from a selected line of bearing to the radio station, and the relative magnitude and sense of displacement of the aircraft from said selected line of bearing, comprising a reference index representing the aircraft, a pair of bars intersecting at an angle whose bisector represents said selected line of bearing, said bars being adapted to be moved relatively to each other, the point of intersection of said bars representing the position of the radio station, means for producing relative rotation between said bisector and said reference index in accordance with the deviation in heading of the aircraft from said selected line of bearing, means for producing relative translatory motion between said bars and said reference index in a direction perpendicular to said bisector in accordance with the relative magnitude and sense of displacement of the aircraft from said selected line of bearing, and means for displacing one of said bars relatively to the other in a direction perpendicular to said bisector in accordance with the distance of the aircraft from the radio station, whereby the point of intersection of said bars moves along a straight-line path parallel to said bisector.

9. Apparatus for producing a visual display representing the distance of an aircraft from a radio station, comprising a reference index representing the aircraft, an indicator comprising a pair of bars intersecting at an angle, the bisector of said angle representing a selected line of bearing to the radio station, and means for producing relative translatory motion between the point of intersection of said indicator and said reference index in a direction parallel to said bisector in accordance with the distance of the aircraft from the radio station.

10. A navigation display instrument for furnishing information to enable an aircraft to fly along a selected radio course comprising a pair of bars adapted to be rotated relatively to each other about respective spaced axes, means for rotating one of said bars to intersect the other at an acute angle whose bisector represents said selected course, and means for rotating one of said bars to be parallel and spaced from the other so as to represent an airport runway.

11. A visual instrument comprising a reference index, an indicator comprising a pair of bars intersecting at an angle and forming an X-shaped figure, means for producing relative rotation between said indicator and said reference index, means for producing relative translatory motion between the point of intersection of said indicator and said reference index in a direction perpendicular to the bisector of said angle, and means for producing relative translatory motion between said point of intersection and said reference index in a direction parallel to said bisector.

12. Apparatus for producing a visual display representing the distance of an aircraft from a radio station, the deviation in heading of the aircraft from a selected line of bearing to the radio station, and the relative magnitude and sense of displacement of the aircraft from said selected line of bearing, comprising a viewing window, a fixed reference index representing the aircraft and located substantially adjacent the center of said viewing window, an indicator comprising a pair of bars intersecting at an angle, the bisector of said angle representing said selected line of bearing, and the point of intersection of said bars representing the position of the radio station, said indicator being located adjacent said viewing window, means for producing relative rotation between said bisector and said reference index in accordance with the deviation in heading of the aircraft from said selected line of bearing, means for producing relative translatory motion between the point of intersection of said indicator and said reference index in a direction perpendicular to said bisector in accordance with the relative magnitude and sense of displacement of the aircraft from said selected line of bearing, and means for producing relative translatory motion between said point of intersection and said reference index in a direction parallel to said bisector in accordance with the distance of the aircraft from the radio station.

13. Apparatus for producing a visual display representing the distance of an aircraft from a radio station, the deviation in heading of the aircraft from a selected line of bearing to the radio station, and the relative magnitude and sense of displacement of the aircraft from said selected line of bearing, comprising a reference index representing the aircraft, an indicator comprising a pair of bars intersecting at an acute angle, the bisector of said acute angle representing said selected line of bearing, means for producing a first signal in accordance with the deviation in heading of the aircraft from said selected line of bearing, means for producing relative rotation between said indicator and said reference index in accordance with said first signal, means for producing a second signal in accordance with the relative magnitude and sense of displacement of the aircraft from said selected line of bearing, means for producing relative translatory motion between the point of intersection of said indicator and said reference index in a direction perpendicular to said bisector in accordance with said second signal, means for producing a third signal in accordance with the distance of the aircraft from the radio station, and means for producing relative translatory motion between said point of intersection and said reference index in a direction parallel to said bisector in accordance with said third signal.

14. Apparatus for producing a visual display representing the distance of an aircraft from a radio station, the deviation in heading of the aircraft from a selected line of bearing to the radio station, the relative magnitude and sense of displacement of the aircraft from said selected line of bearing, and the relative vertical deviation of the aircraft from a selected glide path to the radio station, comprising a reference index representing the aircraft, an indicator comprising a pair of bars intersecting at an acute angle and forming an X-shaped figure, the bisector of said acute angle representing said selected line of bearing, a pointer representing said selected glide path, means for producing relative rotation between said indicator and said reference index in accordance with the deviation in heading of the aircraft from said selected line of bearing, means for producing relative translatory motion between the point of intersection of said indicator and said reference index in a direction perpendicular to said bisector in accordance with the relative magnitude and sense of displacement of the aircraft from said selected line of bearing, means for producing relative translatory motion between said point of intersection and said reference index in a direction parallel to said bisector in accordance with the distance of the aircraft from the radio station, and means for producing relative translatory motion between said pointer and said reference index in accordance with the vertical deviation of the aircraft from said selected glide path.

15. Apparatus for a visual display comprising a pair of substantially straight bars adapted to be moved relatively to each other and to be moved as a unit, a pair of meter movements each comprising first and second coils wound on a common bobbin adapted to be rotated about an axis in a magnetic field, said axes of said bobbins being substantially parallel, a pair of arms each supporting one of said bars from one of said bobbins whereby each bar is adapted to be rotated about the axis of its respective supporting bobbin in accordance with rotational movement of said bobbin, means for supplying electrical current to the first coil of each bobbin to produce rotations thereof of the same sense about their respective axes, and means for supplying electrical current to the second coil of each bobbin to produce rotations thereof of the opposite sense about their respective axes.

16. Apparatus for producing a visual display representing the distance of an aircraft from a radio station comprising a reference index representing the aircraft, a substantially X-shaped indicator having acute vertical angles whose common bisector represents a selected line of bearing through the radio station, first means for producing relative translatory motion between the point of intersection of said indicator and said reference index in a direction parallel to said bisector in accordance with the distance of the aircraft from the radio station, whereby the spacing between said point of intersection and said reference index decreases as said aircraft approaches said radio station, and second means for producing relative translatory motion of the same sense as said first means between said point of intersection and said reference index in accordance with the distance of the aircraft from the radio station, whereby the spacing between said point of intersection and said reference index increases as said aircraft recedes from said radio station.

17. A visual navigation instrument for aircraft comprising a housing having a viewing opening therein, a reference index in said opening, a pair of pointers positioned in said housing to be viewable in said opening, means for mounting said pointers for movement relative to each other and for joint substantially linear movement relative to said index, whereby said pointers normally cross each other to thereby form a point of intersection movable relative to said reference index, means for angularly rotating said pair of pointers as a unit relative to said reference index in accordance with one navigation parameter, means for substantially linearly translating said pair of pointers as a unit relative to said reference index in one direction representative of a second craft navigation parameter, and means for moving said pointers relative to each other in accordance with a third navigation parameter, whereby to substantially linearly translate said point of intersection in a second direction relative to said reference index representative of said third navigation parameter.

18. A visual situation display indicator for use in an aircraft during a plurality of navigation modes of operation of said aircraft comprising a pair of indicator pointers mounted in said indicator for relative angular movement with respect to each other and for joint substantially linear translational movement as a unit, means for producing substantially linear translatory movement of both of said pointers as a unit in all of said navigation modes in accordance with a navigation parameter, and means for producing a predetermined relative angular rotation between each of said pointers in a predetermined one of said navigation modes whereby visually to identify said predetermined navigation mode from the others of said plurality of navigation modes.

References Cited in the file of this patent

UNITED STATES PATENTS

| | | |
|---|---|---|
| 2,043,336 | Sjostrand | June 9, 1936 |
| 2,170,835 | Simon | Aug. 29, 1939 |
| 2,234,980 | Rasmussen | Mar. 18, 1941 |
| 2,307,029 | Elm | Jan. 5, 1943 |